W. H. LEWIS & J. A. PILCHER.
BRAKE ARRANGEMENT FOR SIX WHEEL TRUCKS.
APPLICATION FILED JAN. 14, 1913.

1,068,674.

Patented July 29, 1913.

2 SHEETS—SHEET 1.

Witnesses
D. Frederiksen.
Jno. D. Thomas

Inventors
W. H. Lewis
John A. Pilcher

W. H. LEWIS & J. A. PILCHER.
BRAKE ARRANGEMENT FOR SIX WHEEL TRUCKS.
APPLICATION FILED JAN. 14, 1913.

1,068,674.

Patented July 29, 1913.

2 SHEETS—SHEET 2.

Witnesses

Inventor
W. H. Lewis
John A. Pilcher

UNITED STATES PATENT OFFICE.

WILLIAM H. LEWIS AND JOHN A. PILCHER, OF ROANOKE, VIRGINIA.

BRAKE ARRANGEMENT FOR SIX-WHEEL TRUCKS.

1,068,674.

Specification of Letters Patent.   Patented July 29, 1913.

Application filed January 14, 1913.   Serial No. 741,959.

*To all whom it may concern:*

Be it known that we, WILLIAM H. LEWIS and JOHN A. PILCHER, citizens of the United States, residing at Roanoke, in the county of Roanoke and State of Virginia, have invented certain new and useful Improvements in Brake Arrangements for Six-Wheel Trucks, of which the following is a specification.

The object of this invention is to provide a simple and efficient arrangement of brake beams, levers, rods, etc., for six-wheel trucks for railway cars.

With this object in view, our invention consists in the combination and arrangement of parts as will be more fully hereinafter described, and particularly pointed out in the appended claim.

Figure 1:
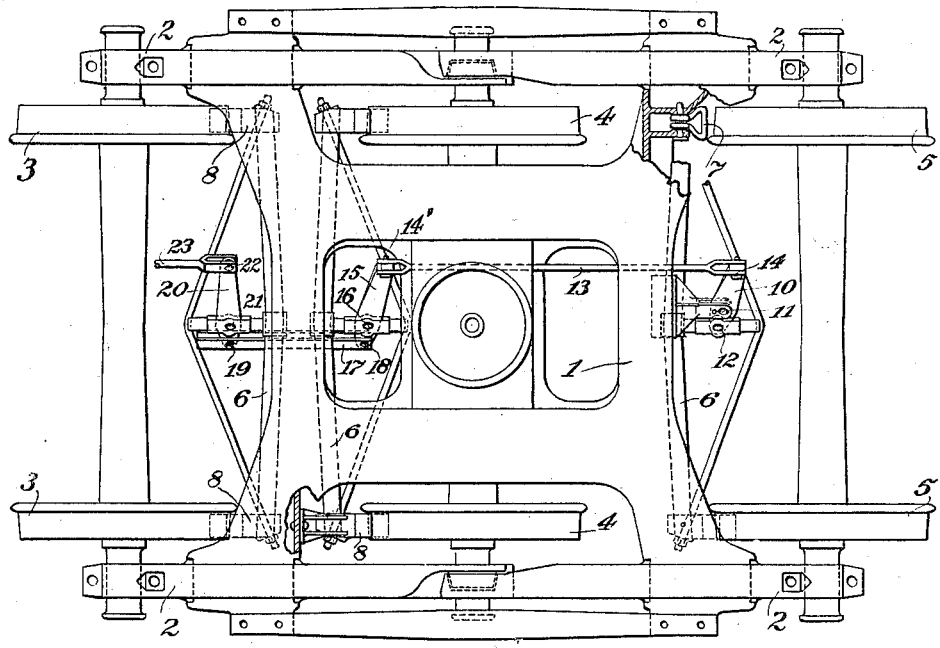
Figure 2:
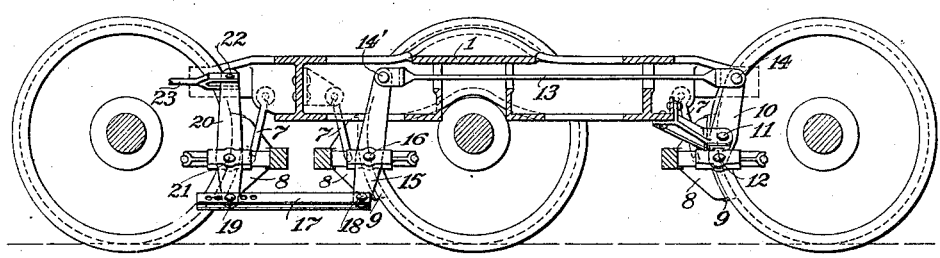
Figure 3:
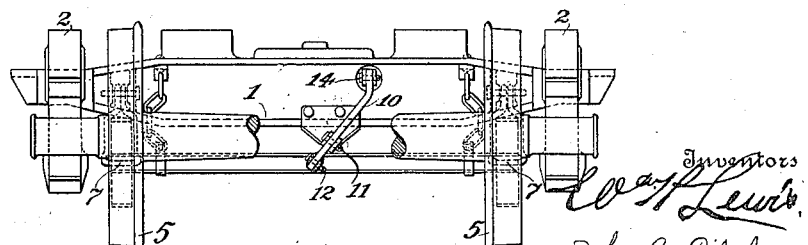
Figure 4:
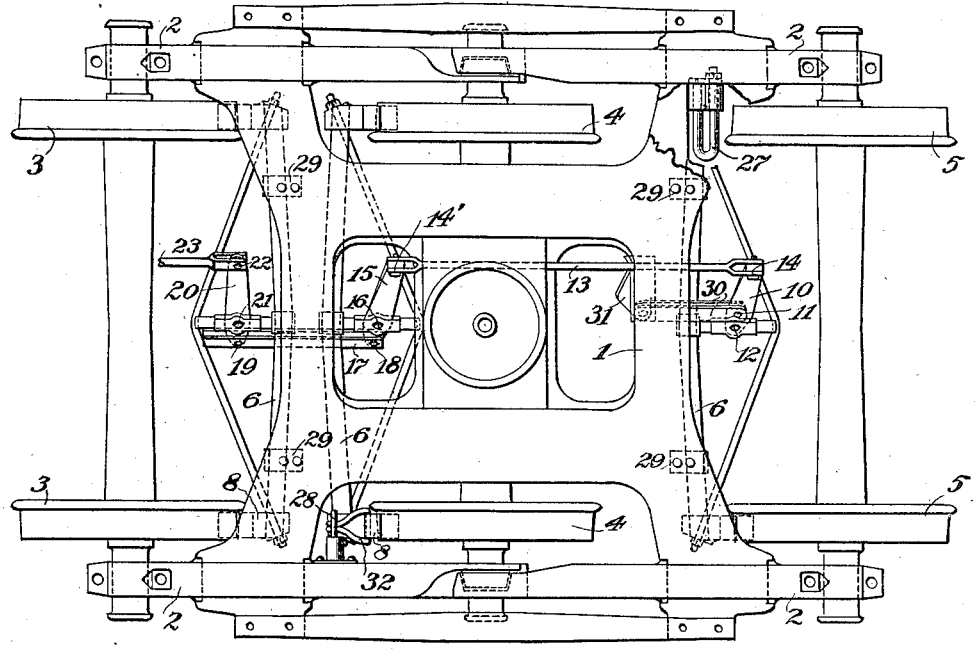
Figure 5:
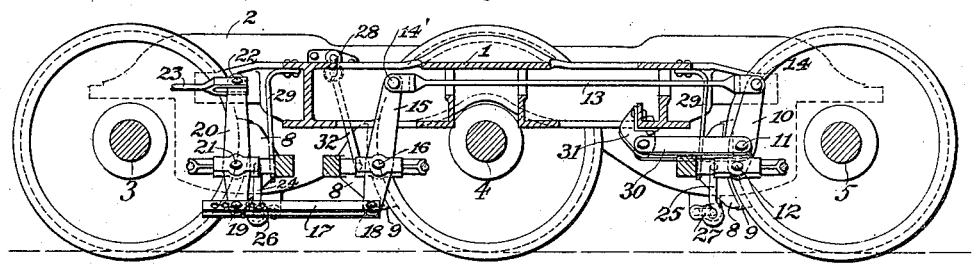

In the drawings, Figure 1 represents in plan view a truck with our invention applied, showing the brake beams for the truck as hanging from the bolster of the truck, Fig. 2 is a side elevation, in section, and Fig. 3 an end elevation of the same. Fig. 4 is a plan view showing an alternate arrangement in which the brake beams are suspended from and supported by the truck side frames. Fig. 5 is a side elevation in section, and Fig. 6 an end elevation partly in section of this latter arrangement of beams.

Referring to the drawings in which like parts are given the same reference numbers wherever they occur, 1 represents the bolster of a six wheel truck of the type shown and described in our previous application for Letters Patent, Serial No. 718,910, filed Sept. 6, 1912, 2 represents the side frames of the same, and 3—4 and 5 the pairs of wheels on their respective axles.

The brake beams 6 are hung from the bolster 1 in the customary manner, by means of U-shaped hangers 7 which are hinged to the bolster at the top by means of transverse, horizontal pintles, the brake heads 8 being hooked over the U-shaped hangers at the bottom. The brake shoes 9 are keyed to the brake heads 8 in the usual manner.

The brake beam 6 which is intended for use in braking the wheels 5 is actuated by means of a lever 10 which is permanently fulcrumed at a point 11 to the bolster 1, the brake beam being pivotally connected to the bottom of the lever 10 at 12. As will be hereinafter shown, the location of this fulcrum point should be such that the braking power will be equalized among all of the beams. A pull rod 13 is pivotally connected at one end to the top of lever 10 at 14 in such a manner that a longitudinal pull in the rod 13 will force the brake shoes 9 against the wheels 5. The other end of the pull rod 13 is pivotally connected at 14' to the top of a floating lever 15. This floating lever 15 is intended to operate the brake beam for the middle pair of wheels 4 and is pivotally connected to said brake beam at 16.

A push rod 17 is pivotally connected at its inner end to the bottom of lever 15 at 18 and extends longitudinally of the truck between and below the axles of the wheels 4 and 3, the outer end of the same being pivotally connected at 19 to the bottom of a second floating lever 20 which is intended to actuate the brake beam for the outer truck wheels 3, the brake beam being pivotally connected to the lever 20 at 21. The top of the lever 20 is arranged at 22 for pivotal connection to a pull member 23 from the brake operating mechanism on the car body.

The operation of our invention is as follows: When the hand or power brake on the car body is applied, the rod 23 pulls the top of lever 20 outward and draws the brake shoes up against the wheels 3. The lever 20 fulcrums at 21 and pushes the bottom of lever 15 inward, pushing the brake shoes up against the wheels 4. Lever 15 in turn fulcrums about the point 16 and the top of lever 15 moves outward, pulling with it the rod 13 and the top of lever 10. Lever 10 being permanently fulcrumed at 11, the brake beam for wheels 5, which is connected to lever 10 below the fulcrum point 11, will be moved in the opposite direction, forcing the shoes against the wheels 5.

As previously referred to, the location of the fulcrum point 11 in lever 10 should be such that when the similar ends of levers 20 and 15 are of the same or relative lengths, the load on the brake beam for wheels 5 will be the same as for the other two pairs of wheels.

Figure 6:
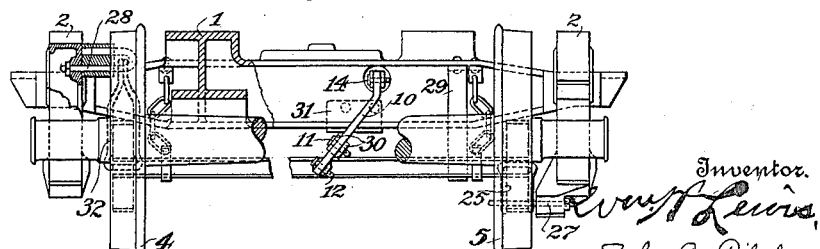

As previously stated, Figs. 4, 5 and 6 show the same arrangement of brake levers and rods, but show the beams hung from or supported by the side frames instead of from the bolster as in Figs. 1, 2 and 3.

With this arrangement the vertical movement of the bolster on the springs relative to the wheels does not carry the brake beams with it as is the case in the previous arrangement. The U-shaped brake beam supports 24 and 25 for the two outer pairs of wheels are pivotally connected to the side frames at points 26 and 27 below the brake heads. The beam for the middle pair of wheels, however, is hung by a U-shaped hanger 32 from a point 28 on a side frame in the identical manner described in the previous arrangement of brakes hung from the bolster. With this arrangement it is necessary to provide release springs 29 for the outer brake beams to throw them back from the wheels when the brake is released. The beam for the middle wheels, however, as well as all of those in the arrangement with the brakes hung from the bolster will drop away from their own weight and so require no release springs. In order to allow free movement of the bolster, vertically, in respect to the brake beams when they are supported from the side frames it is necessary to provide a floating fulcrum 11, for the lever 10. This is accomplished by means of the links 30 which are pivoted at their inner ends to a bracket 31 on the bolster, the outer ends of same forming the fulcrum point 11 for the lever 10. The operation of the levers, etc., in this latter arrangement is the same as already described for brakes hung from the bolster.

Having thus described our invention, what we claim as new and desire to secure by Letters Patent is,

In a 6-wheel truck for railway cars, the combination of a bolster, 3 axles with their customary wheels, boxes, bearings, etc., a brake beam with heads and shoes for each pair of said wheels, a dead lever fulcrumed to said bolster, to the lower end of which is pivotally connected the brake beam for an outer pair of wheels, a tension member pivotally connected at one end to the top of said dead lever, and pivotally connected at its other end to the top extremity of a floating lever, to which is pivotally connected between the extremities of said floating lever, the brake beam for the middle pair of wheels, a compression member pivotally connected at one end to the bottom extremity of said floating lever, and an additional floating lever pivotally connected at its bottom extremity to the other end of said compression member, to which is pivotally connected between the extremities of the aforesaid additional floating lever the brake beam for the other outer pair of wheels, and having at its top extremity means for connection with the brake rigging on the car body.

In testimony whereof we affix our signatures in presence of two witnesses.

WILLIAM H. LEWIS.
JOHN A. PILCHER.

Witnesses:
R. H. REESINGER,
B. W. KADEL.